Sept. 10, 1929.    G. P. WALLSTROM    1,728,155
ART OF SAWING WITH ABRASIVES
Filed June 14, 1928
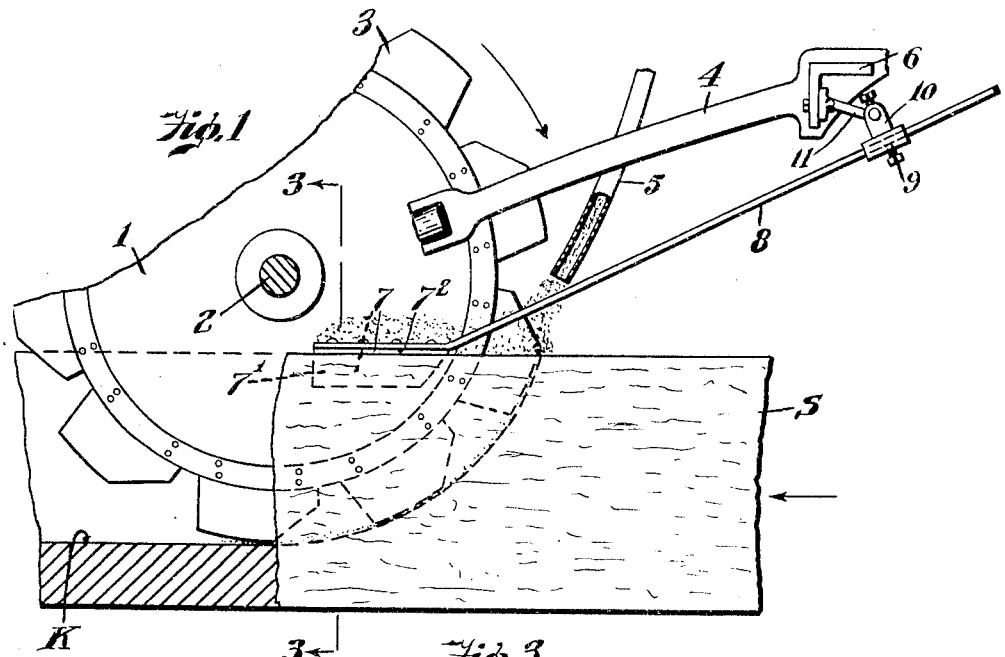
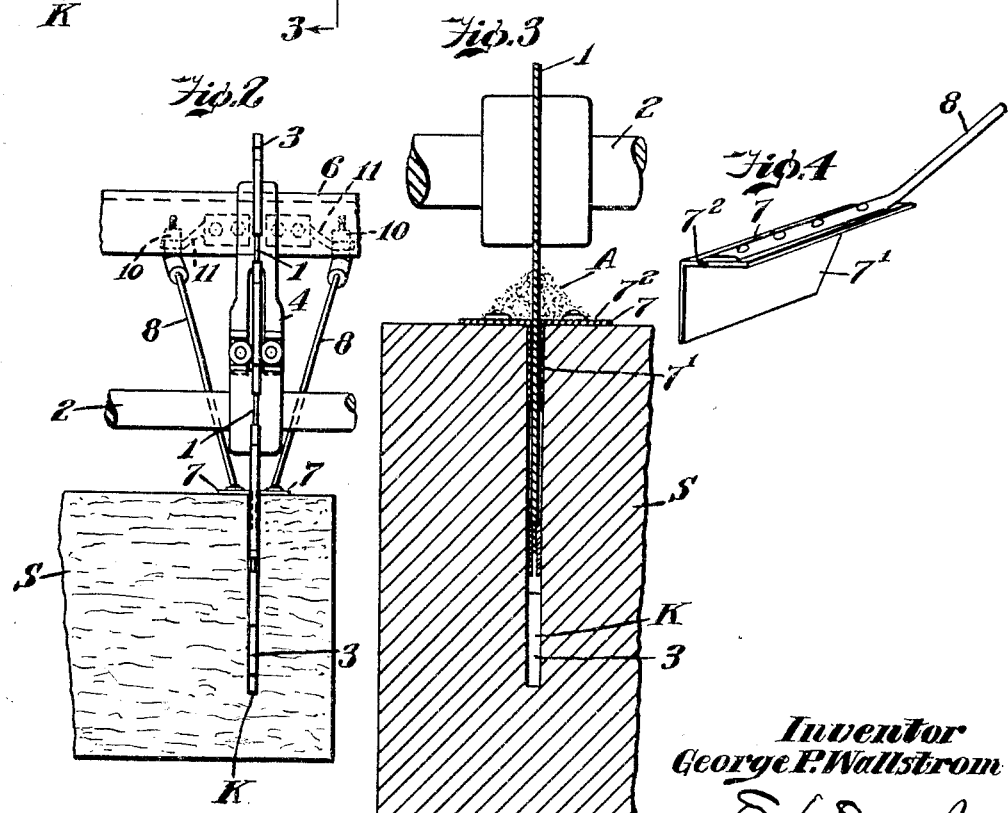
Inventor
George P. Wallstrom
By Ellis Spackh
Attorney Patented Sept. 10, 1929.

1,728,155

UNITED STATES PATENT OFFICE.

GEORGE P. WALLSTROM, OF MONTPELIER, VERMONT, ASSIGNOR TO LANE MANUFACTURING COMPANY, OF MONTPELIER, VERMONT, A CORPORATION OF VERMONT.

ART OF SAWING WITH ABRASIVES.

Application filed June 14, 1928. Serial No. 285,312.

In the art of sawing stone and particularly granite by the usual rotary stone saw using chilled shot, sand or the like, as the abrasive, two factors are present which frequently make for imperfection in the final product. One of these factors is the tendency of the abrasive to pack itself at the top of the saw kerf and be rubbed against the walls of the kerf above the cutting edge of the blade as the kerf deepens. This results in the rounding off of the walls of the saw kerf at its outer edge, particularly at the corners, which detracts from the desired smoothness or squareness of the kerf. Another factor is the tendency of the shot, sand or other abrasive to be thrown against the stone with tremendous force as the stone passes under the saw. This is due to the action of centrifugal force caused by the rotating blade and is particularly noticeable in sawing granite, where the stone frequently is polished to a high gloss or has a very fine hammered finish. Under the impact of the abrasive the stone is often marred for a few inches along its top or outer surface on each side of the cut.

In the case of the rounding-off of the saw kerf along its outer edge such rounding-off has heretofore been considered unavoidable, and where the departure from the desired squareness of kerf has been too pronounced, it has been customary when the kerf was completed simply to smooth up the outer edge of the kerf as well as possible by usual hand methods. In other words, the cause was allowed to become an effect and it was then attempted to remove the objection to the effect.

In the case of the stone being marred along its top or outer surface on each side of the cut by the flying abrasive, various expedients have been devised to protect the stone from the direct impact of the abrasive. Rubber, plaster and cardboard guards have all been used. The rubber, however, curled away from the surface to be protected under the action of the water of the abrasive sludge, the plaster broke, and the cardboard was softened by the water.

In the first phase of my invention, I prevent the accumulation of abrasive in the saw kerf above the cutting edge of the blade while the blade is at work, or differently expressed, I so shield the outer edge of the saw kerf against the accumulation of abrasive therein that such edge cannot be worn away by the abrasive as the blade progresses into the stone. This results in an original saw kerf having that smoothness and squareness of outline so greatly desired in the trade.

In the second phase of my invention, the shields or guards act to prevent the surface from being marred by the impact of the flying abrasive.

The manner of practicing my invention, together with suitable apparatus for carrying out the principles involved, is described and shown in the accompanying specification and drawings, and the characteristic features of novelty are particularly pointed out in the appended claims.

In the drawings:—

Fig. 1 is an elevation, partly broken away, of a rotary saw of standard type equipped in accordance with my invention and showing the saw at work.

Fig. 2 is an edge view of Fig. 1.

Fig. 3 is a section on the line 3—3 of Fig. 1, and

Fig. 4 is a detail view of one of the abrasive guards or shields, removed.

The saw blade 1 is a disc which is revoluble about the axis shaft 2 and is provided with a peripheral series of inserted saw teeth 3 of any desired configuration. The stone or other work is indicated at S, the saw kerf at K, the saw guide at 4, the abrasive feed at 5 and a portion of the frame on which the saw guide is mounted at 6.

In order to prevent the tendency of the abrasive, indicated at A, to pack at the top of the saw kerf and wear down the outer edges of the kerf as the saw progresses into the stone, I provide a guard indicated generally at 7 at either side of the saw kerf. The guards 7 may be attached to any stationary mounting, as for example, the frame 6. As here shown, each guard 7 consists of an angle piece mounted just back of the blade rim and presenting a vertically disposed portion 7' which enters the saw kerf and closely bears against the wall thereof and a horizontally disposed portion $7^2$ which rests on the upper surface of the stone or other work. The two oppositely disposed guards thus line the upper edge of the saw kerf with the saw blade operating in the space between the depending portions 7'.

As contemplated herein, the guards of shields will be so mounted as to be capable of independent adjustment relative to each other and relative to the saw teeth so as to accommodate any height of stone or any depth of saw cut. To this end the guards are each mounted upon an angularly bent rod 8 which is adjustably fastened at 9 to a bearing 10 which in turn is adjustably connected at 11 to some stationary point as the frame 6. The connections 9, 10 and 11 permit a universal adjustment of the rods 8 relative to the saw.

Where used with stones which are not rough sawn but which are polished to high gloss or have a very fine hammered finish, the guards serve to protect the top or outer surface of the stone on each side of the cut from the impact of the abrasive as it is thrown outwardly by the centrifugal force of the rotating blade. Where unprotected, the action of the abrasive is to mar the surface on each side of the cut necessitating refinishing at great expense of the polished or fine hammered surface.

Various modifications in the construction and operation of my device may obviously be resorted to if within the spirit and scope of my invention as defined by the appended claims.

What I therefore claim and desire to secure by Letters Patent is:

1. In the art of sawing with abrasives, that step which consists in lining the walls of the saw kerf with shield members which define a space therebetween within which the saw blade may work and which shield members protect the saw kerf from being worn down as the saw progresses into the work.

2. In the art of sawing with abrasives, that step which consists in protecting the saw kerf from being worn down by the abrasive as the saw progresses into the work by lining the walls of the saw kerf with shield members which define a space therebetween within which the saw may work and which shields have portions extending along the outer surface of the work in opposite directions on either side of the blade.

3. An abrasive shield for the outer edge of a saw kerf, comprising a member presenting a portion disposed within the saw kerf and a portion resting on the outer surface of the work adjacent the saw kerf.

4. An abrasive shield for a saw kerf, comprising a member presenting spaced portions depending into the saw kerf from above and between which portions the saw blade operates.

5. An abrasive shield for a saw kerf comprising a member presenting spaced portions depending into the saw kerf from above and between which portions the saw blade operates and other portions resting on the outer surface of the work on either side of the saw blade and extending in opposite directions.

6. An abrasive shield for a saw kerf comprising a pair of angular members, each member presenting a substantially vertically disposed portion depending into the saw kerf from above and closely bearing against one wall of the kerf and a substantially horizontally disposed portion resting on the outer surface of the work, the vertically disposed portions of said members defining therebetween a space within which the saw blade may operate and the horizontally disposed portions extending in opposite directions on either side of the saw blade.

7. An abrasive shield for a saw kerf comprising a pair of angular members, each member presenting a substantially vertically disposed portion depending into the saw kerf from above and closely bearing against one wall of the kerf and a substantially horizontally disposed portion resting on the outer surface of the work, the vertically disposed portions of said members defining therebetween a space within which the saw blade may operate and the horizontally disposed portions extending in opposite directions on either side of the saw blade, and means for independently adjusting said shields relative to each other and to the saw blade.

8. In a circular saw, the combination with a saw blade and its abrasive feed, of abrasive shields for the saw kerf comprising a pair of spaced oppositely disposed portions depending into the saw kerf from above and closely bearing against the opposite side walls of the kerf and defining a space within which the saw blade may operate, and a pair of oppositely extending portions resting on and bearing closely against the outer surface of the work on either side of the saw blade.

9. In a circular saw, the combination with a saw blade and its abrasive feed, of abrasive shields for the saw kerf comprising a pair of spaced oppositely disposed portions depending into the saw kerf from above and closely bearing against the opposite side walls of the kerf and defining a space within which the saw blade may operate, and a pair of oppositely extending portions resting on and bearing closely against the outer surface of the work on either side of the saw blade, and means for independently adjusting said shields relative to each other and relative to the saw blade.

10. An abrasive shield of the class described, comprising a member presenting a portion disposed within the saw kerf and a portion disposed on the outer surface of the stone being sawed adjacent the saw kerf for protecting such surface against the action of the abrasive.

In testimony whereof I affix my signature.

GEORGE P. WALLSTROM.